United States Patent
Monkhouse et al.

(10) Patent No.: US 10,988,033 B2
(45) Date of Patent: Apr. 27, 2021

(54) CONTROL SYSTEM FOR A VEHICLE

(71) Applicant: PROTEAN ELECTRIC LIMITED, Surrey (GB)

(72) Inventors: Helen Monkhouse, Surrey (GB); Richard Thomas Burke, Hook (GB); Christopher David Hilton, Wokingham (GB)

(73) Assignee: PROTEAN ELECTRIC LIMITED, Surrey (GB)

( * ) Notice: Subject to any disclaimer, the term of this patent is extended or adjusted under 35 U.S.C. 154(b) by 249 days.

(21) Appl. No.: 15/763,058

(22) PCT Filed: Sep. 20, 2016

(86) PCT No.: PCT/IB2016/055600
§ 371 (c)(1),
(2) Date: Mar. 23, 2018

(87) PCT Pub. No.: WO2017/051308
PCT Pub. Date: Mar. 30, 2017

(65) Prior Publication Data
US 2018/0272892 A1    Sep. 27, 2018

(30) Foreign Application Priority Data

Sep. 24, 2015   (GB) ..................... 1516902

(51) Int. Cl.
*B60L 9/00*    (2019.01)
*B60L 15/20*   (2006.01)
(Continued)

(52) U.S. Cl.
CPC ........ *B60L 15/2036* (2013.01); *B60K 7/0007* (2013.01); *B60K 28/14* (2013.01);
(Continued)

(58) Field of Classification Search
CPC ........... B60L 15/2036; B60L 2240/429; B60L 2240/423; B60L 2220/14; B60L 2220/44;
(Continued)

(56) References Cited

U.S. PATENT DOCUMENTS

| 5,343,971 A * | 9/1994 | Heidelberg ............... B60L 7/22 |
| | | 180/65.245 |
| 10,259,498 B2 * | 4/2019 | Jagenstedt ........... A01D 34/008 |

(Continued)

FOREIGN PATENT DOCUMENTS

| AT | 400698 B | 2/1996 |
| EP | 2676831 A1 | 12/2013 |

(Continued)

OTHER PUBLICATIONS

European Patent Office, International Search Report, dated Dec. 12, 2016, WIPO, Rijswijk.

(Continued)

*Primary Examiner* — Shardul D Patel
(74) *Attorney, Agent, or Firm* — Nolte Lackenbach Siegel

(57) ABSTRACT

A control system for a vehicle having a first wheel (101) arranged to be driven by a first drive source and a second wheel (101) arranged to be driven by a second drive source, wherein the first wheel and the second wheel are transversely located on the vehicle, the control system comprising a controller (102) and a monitoring device, wherein the monitoring device is arranged to monitor the power differential between the power being applied to the first wheel by the first drive source and the power being applied to the second wheel by the second drive source, wherein upon a determination that the power differential between the power being applied to the first wheel and the second wheel is greater than a predetermined value, the controller is arranged to reduce the power differential.

18 Claims, 8 Drawing Sheets

(51) Int. Cl.
  *B60W 30/02* (2012.01)
  *B60K 28/14* (2006.01)
  *B60K 7/00* (2006.01)
  *B60W 10/08* (2006.01)
  *B60L 3/04* (2006.01)
  *B60L 3/00* (2019.01)
  *B60L 50/51* (2019.01)

(52) U.S. Cl.
  CPC .............. *B60L 3/0061* (2013.01); *B60L 3/04* (2013.01); *B60L 50/51* (2019.02); *B60W 10/08* (2013.01); *B60W 30/02* (2013.01); B60K 2007/0038 (2013.01); B60K 2007/0092 (2013.01); *B60L 2220/14* (2013.01); *B60L 2220/44* (2013.01); *B60L 2240/12* (2013.01); *B60L 2240/421* (2013.01); *B60L 2240/423* (2013.01); *B60L 2240/429* (2013.01); *B60L 2260/28* (2013.01); *B60W 2510/083* (2013.01); *B60W 2510/085* (2013.01); *B60W 2520/406* (2013.01); *B60W 2710/083* (2013.01); *B60W 2710/086* (2013.01); *B60W 2720/406* (2013.01); *B60Y 2200/91* (2013.01); *Y02T 10/64* (2013.01); *Y02T 10/70* (2013.01); *Y02T 10/72* (2013.01)

(58) Field of Classification Search
  CPC .......... B60L 2240/12; B60L 2240/421; B60L 15/28; B60L 2240/42; B60L 2260/44; B60L 2220/42; B60L 2220/46; B60L 15/32; B60L 3/04; B60L 3/0061; B60L 50/51; B60L 58/12; B60L 2260/28; B60L 9/00; B60Y 2200/91; Y02T 10/72; Y02T 10/7044; Y02T 10/705; Y02T 10/7005; Y02T 10/7275; Y02T 10/645; Y02T 10/646; B60W 2720/406; B60W 30/02; B60W 30/188; B60W 10/08; B60W 2710/083; B60W 2520/406; B60W 2510/083; B60W 2510/085; B60W 2710/086; B60K 28/14; B60K 7/0007; B60K 2007/0038; B60K 2007/0092; B60K 1/02

USPC ............................... 701/22; 180/6.5, 65.245
  See application file for complete search history.

(56)  References Cited

U.S. PATENT DOCUMENTS

2005/0238339 A1* 10/2005 Bargheer ........... B60H 1/00878
  392/379
  2009/0139782 A1   6/2009 Cull et al.
  2010/0187905 A1*  7/2010 Tang ..................... B60K 7/0007
  307/10.1
  2012/0330484 A1* 12/2012 Martin ..................... B60L 7/18
  701/22
  2014/0067181 A1*  3/2014 Kato ..................... B60W 30/18
  701/22
  2015/0012158 A1*  1/2015 Makino ............... B60L 15/2036
  701/22
  2015/0283918 A1* 10/2015 Honda ............... B60K 23/0808
  180/6.5
  2016/0144739 A1*  5/2016 Ando ............. B60W 30/18145
  701/22
  2018/0222528 A1*  8/2018 Jagenstedt ............. F16D 65/18

FOREIGN PATENT DOCUMENTS

EP      2810818 A1   12/2014
  WO    2015016236 A1    2/2015
  WO    2015099032 A1    7/2015

OTHER PUBLICATIONS

European Patent Office, Written Opinion of the ISR, dated Mar. 30, 2017, WIPO, Munich.
Intellectual Property Office, Exam Report, dated Apr. 5, 2016, IPO, South Wales.
Intellectual Property Office, Search Report First, dated Apr. 5, 2016, IPO, South Wales.

* cited by examiner

US 10,988,033 B2

1

CONTROL SYSTEM FOR A VEHICLE

CROSS-REFERENCE TO RELATED APPLICATIONS

This Application is a 371 Application of International Patent Application Ser. No. PCT/IB2016/055600, entitled, "Control System For a Vehicle, filed Sep. 20, 2016, which claims priority to GB Application No. 1516902.2, filed Sep. 24, 2015.

The present invention relates to a control system, in particular a control system for a vehicle.

With increased interest being placed in environmentally friendly vehicles there has, perhaps unsurprisingly, been a corresponding increase in interest in the use of electric vehicles.

Although most commercially available electric vehicles utilise a central electric motor that is used to drive two or more of the vehicles wheels, an alternative solution that is gaining increased popularity utilises in-wheel electric motors, where individual electric motors are used to drive the respective wheels of a vehicle, thereby allowing torque delivery to each wheel to be independently controlled. The fast response characteristics of an electric motor together with independent torque control to the wheels of a vehicle allow in-wheel electric motors to be used to improve vehicle stability complementing or replacing additional vehicle stability control mechanisms. For example, the independent torque control of in-wheel electric motors can be used to provide both traction control and vehicle dynamic control.

However, for vehicles having a plurality of wheels driven by their own independent drive source, if torque delivery to each road wheel is applied incorrectly any associated torque asymmetry may cause the hazard induced yaw.

Consequently, a vehicle having a drive system, in which torque is independently delivered to each wheel of the vehicle, preferably includes a monitoring system that monitors the torque being applied to each respective wheel, where the monitoring system takes corrective action should the torque asymmetry reach an unacceptable level.

However, the torque asymmetry that will result in a hazard induced yaw condition occurring is speed dependent, for example larger torque discrepancies can be tolerated at lower speeds. Accordingly, torque monitoring systems currently need to be pre-programmed with different torque asymmetry limits for different vehicle speeds, which increases the tasks required to pre-configure a vehicle.

In accordance with an aspect of the present invention there is provided a controller and method according to the accompanying claims.

The present invention as claimed provides a speed independent mechanism for preventing a hazard induced yaw condition occurring within a vehicle.

The present invention will now be described, by way of example, with reference to the accompanying drawings, in which.

2

Figure 6:
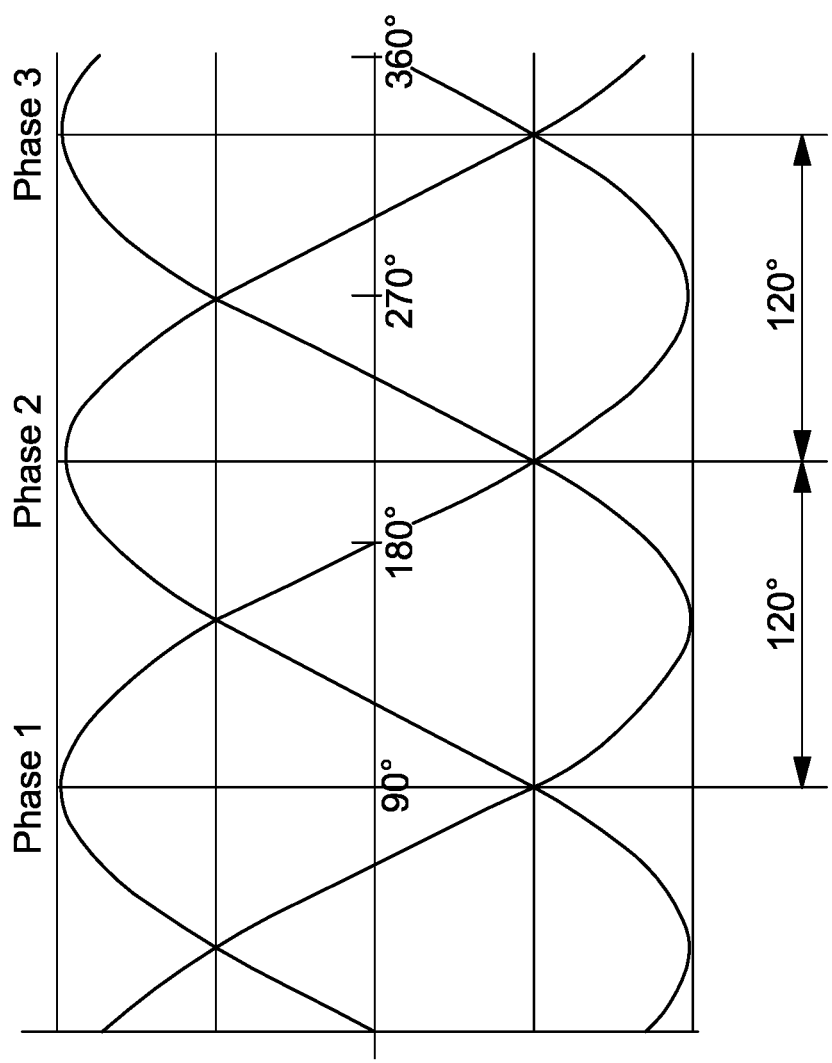
Figure 7:
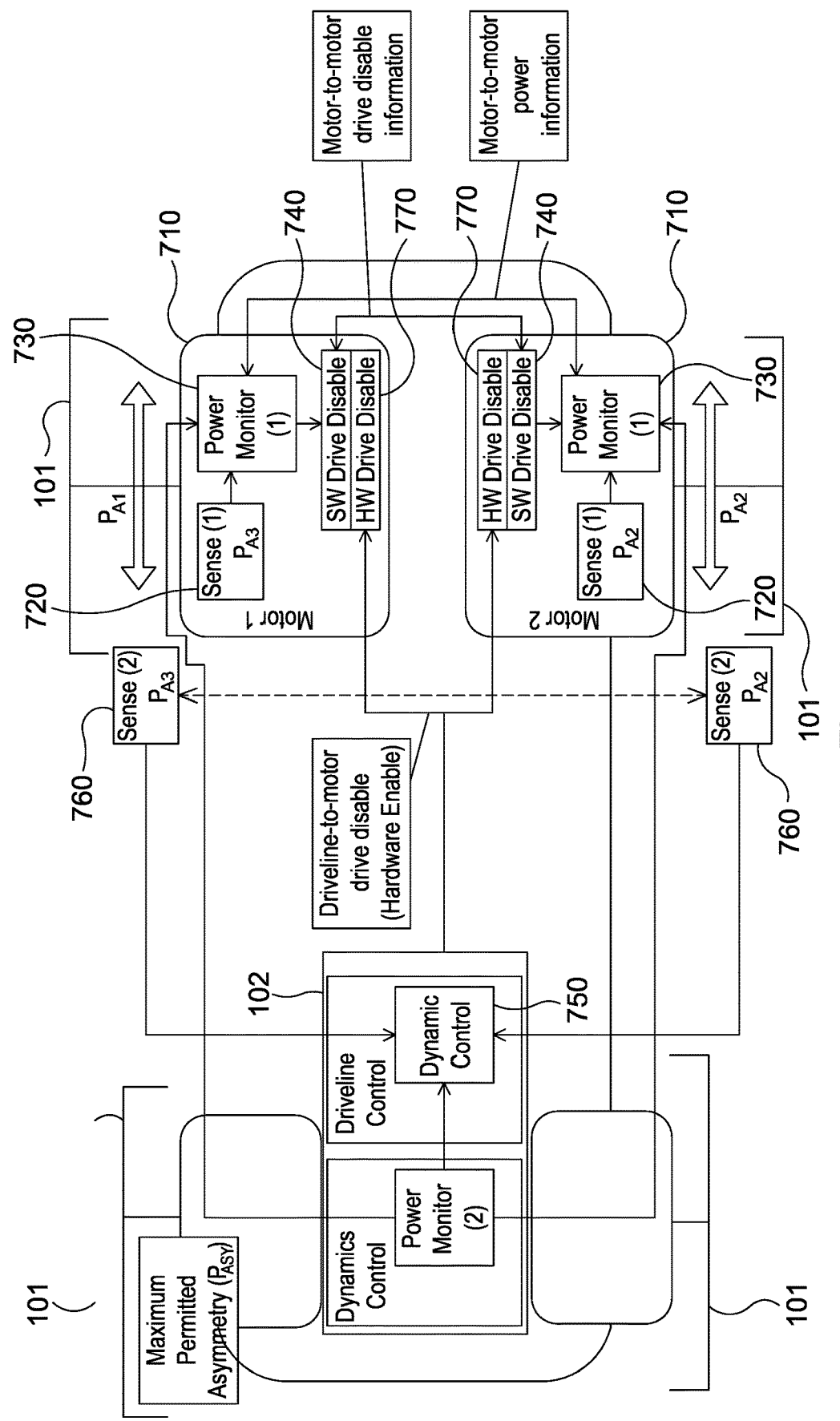
Figure 8:
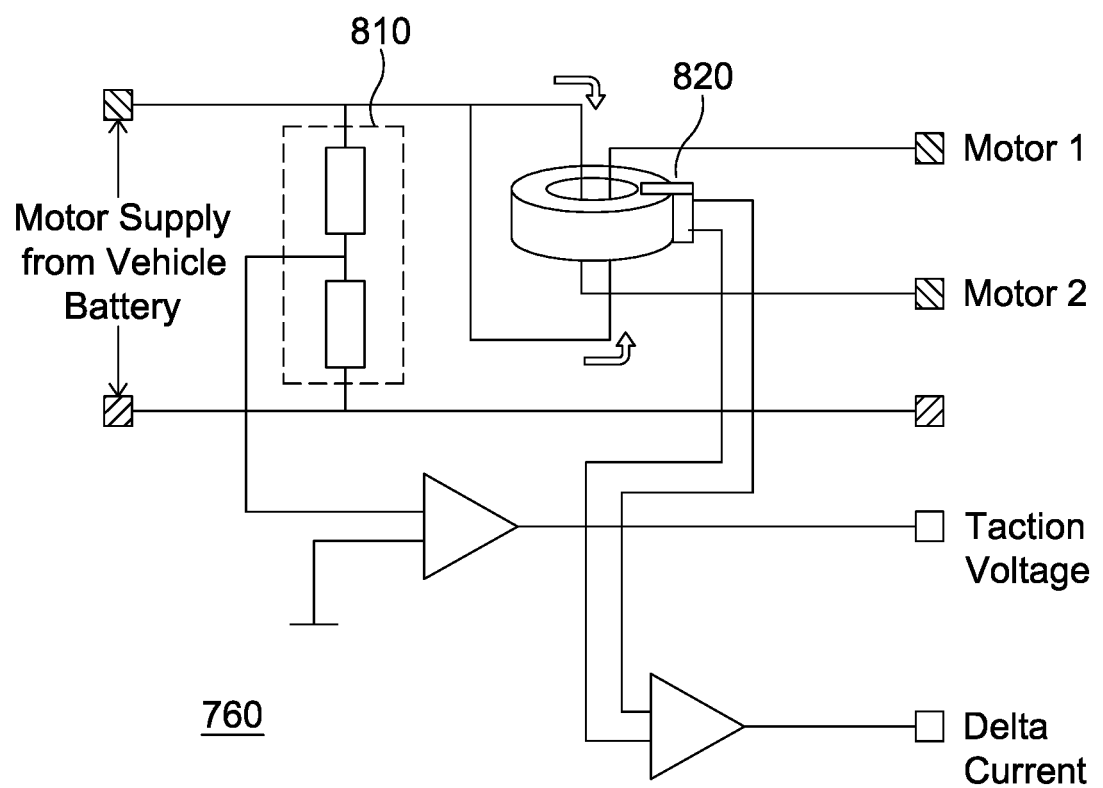

FIG. 6 illustrates phase currents in a three phase electric motor;

FIG. 7 illustrates a stability control system according to an embodiment of the present invention;

FIG. 8 illustrates a current monitoring configuration according to an embodiment of the present invention.

The embodiment of the invention described is for a control system for preventing a hazard induced yaw condition occurring using an estimate of motor mechanical power (T$\omega$) and/or motor electrical power (VI). The control system is arranged to monitor the power generated by two or more electric motors that are arranged to provide independent drive to a respective wheel of a vehicle. For the purposes of the present embodiment the electric motors are for use in a wheel of a vehicle, however the electric motors may be located anywhere within the vehicle. The motors are of the type having a set of coils being part of a stator for attachment to a vehicle, radially surrounded by a rotor carrying a set of magnets for attachment to a wheel. In addition, some of the aspects of the invention are applicable to an arrangement having the rotor centrally mounted within radially surrounding coils. As would be appreciated by a person skilled in the art, the present invention is applicable for use with other types of electric motors or drive systems.

Figure 1:
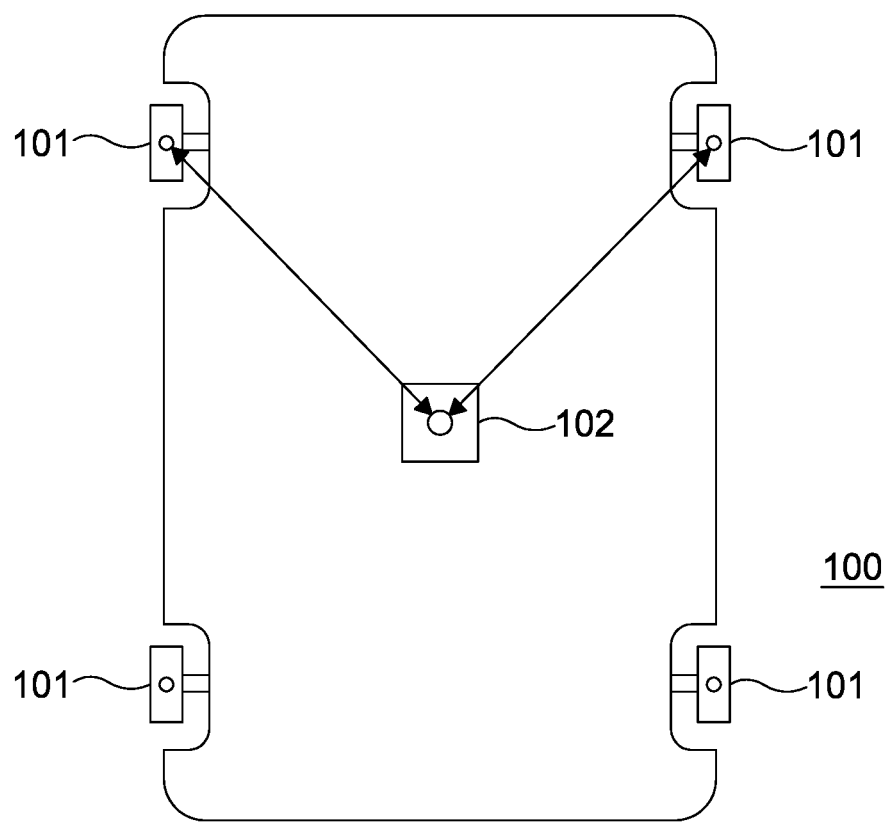
FIG. 1 illustrates a vehicle according to an embodiment of the present invention.

FIG. 1 illustrates a vehicle 100, for example a car or lorry, having four wheels 101, where two wheels are located in the vehicles forward position in a near side and off side position respectively, where the near side wheel is designated the first wheel and the off side wheel is designated the second wheel. Similarly, two additional wheels are located in the vehicles aft position in near side and off side positions respectively, as is typical for a conventional car configuration. However, as would be appreciated by a person skilled in the art, the vehicle may have any number of wheels.

Incorporated within each of the two front wheels 101 is an in-wheel electric motor, as described in detail below, where each in-wheel electric motor acts as a drive source for each respective wheel. However, although the current embodiment describes a vehicle having an in-wheel electric motor associated with each of the two front wheels 101, as would be appreciated by a person skilled in the art other in-wheel electric motor configurations may be adopted. For example, for a four wheeled vehicle all the wheels may have associated in-wheel motors or alternately only the rear two wheels may have associated in-wheel motors.

Coupled to each in-wheel electric motor is a central controller 102, where the function of the central controller 102 is described in detail below.

Figure 2:
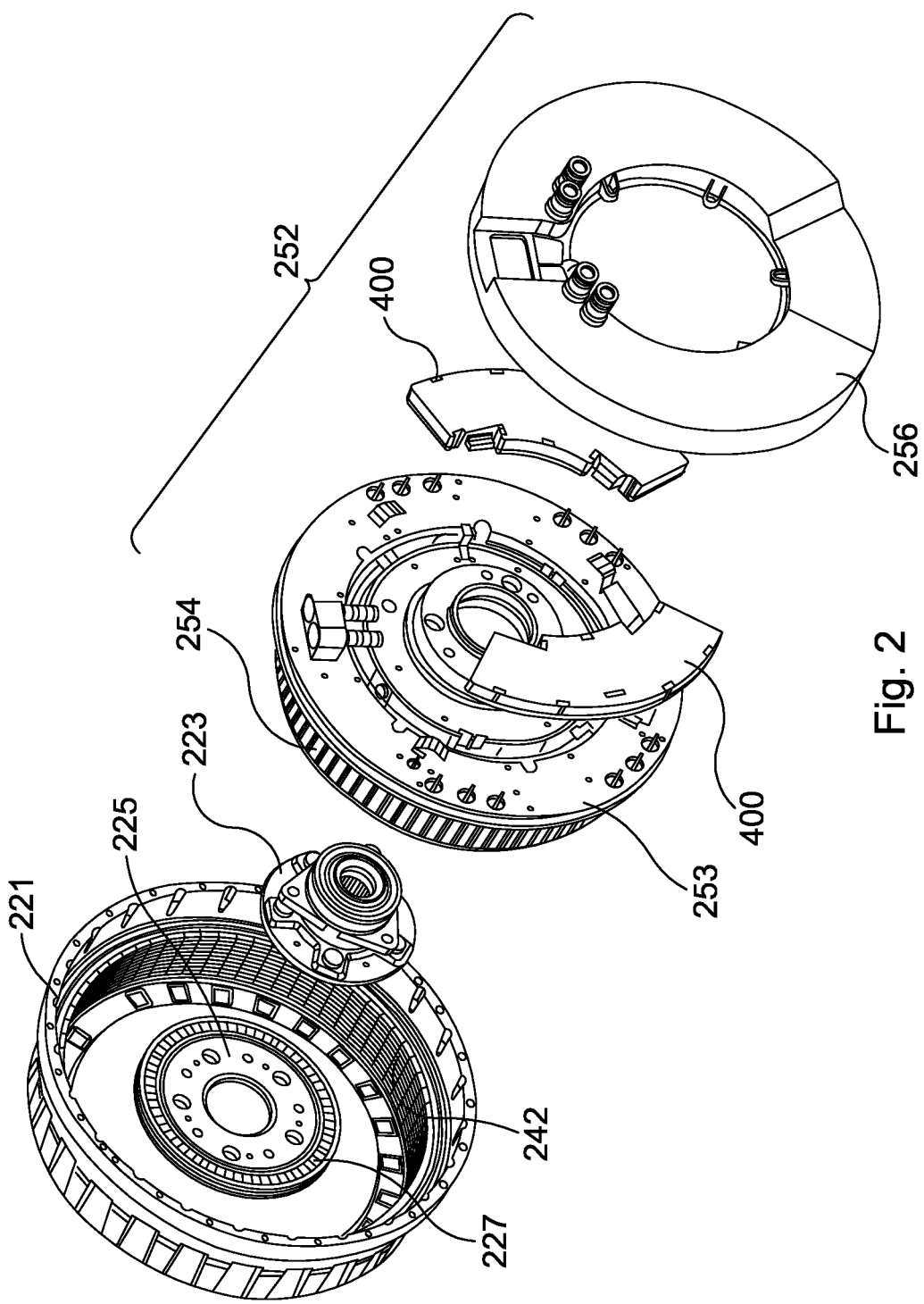
FIG. 2 illustrates an exploded view of an electric motor as used in an embodiment of the present invention.
Figure 3:
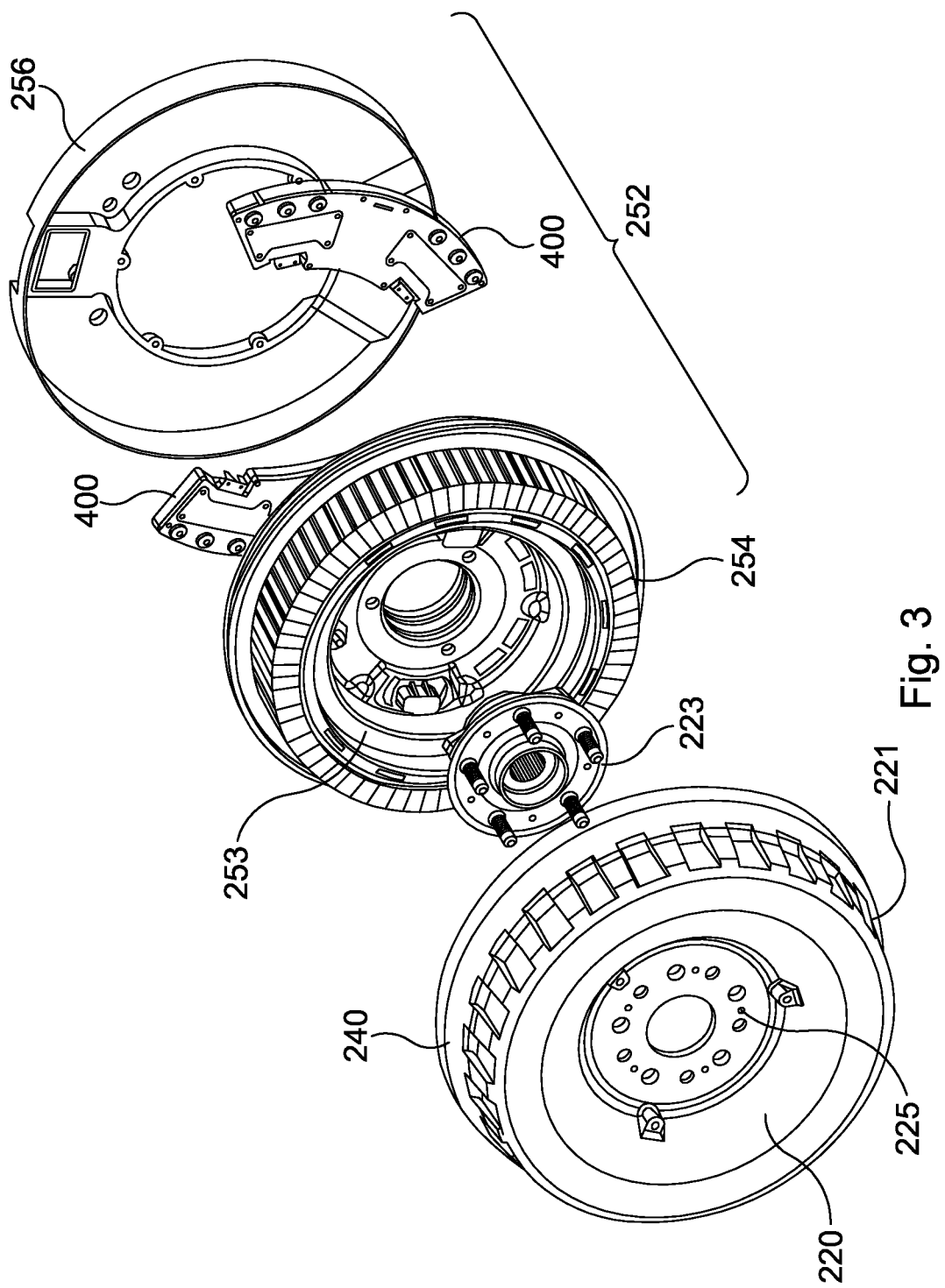
FIG. 3 illustrates an exploded view of the electric motor shown in FIG. 2 from an alternative angle.

For the purposes of the present embodiment, as illustrated in FIG. 2 and FIG. 3, the in-wheel electric motor includes a stator 252 comprising a heat sink 253, multiple coils 254, two control devices 400 mounted on the heat sink 253 on a rear portion of the stator for driving the coils, and an annular capacitor, otherwise known as a DC link capacitor, mounted on the stator within the inner radius of the control devices 400. The coils 254 are formed on stator tooth laminations to form coil windings. A stator cover 256 is mounted on the rear portion of the stator 252, enclosing the control devices 400 to form the stator 252, which may then be fixed to a vehicle and does not rotate relative to the vehicle during use.

Figure 4:
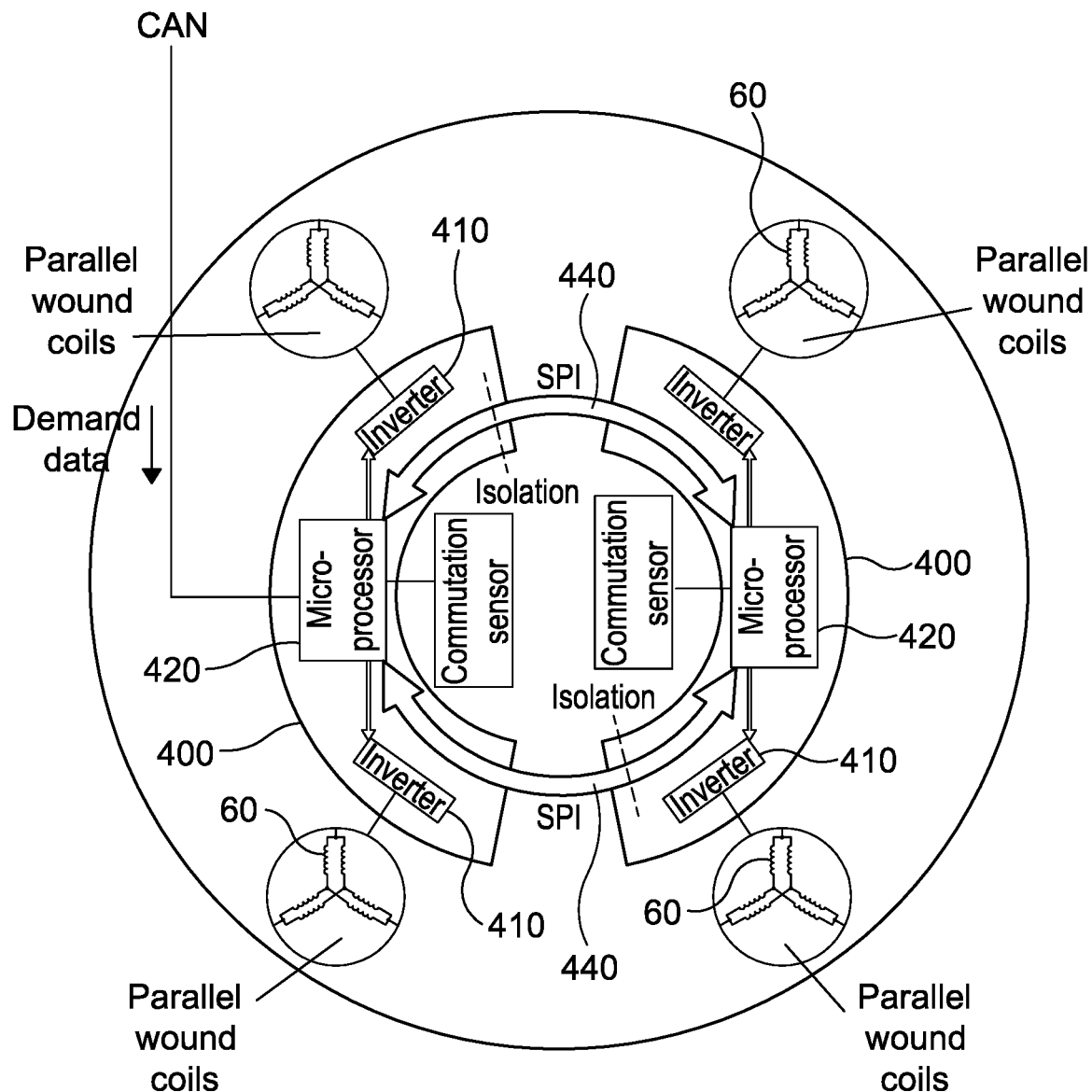
FIG. 4 illustrates an electric motor according to an embodiment of the present invention.

Each control device 400 includes two inverters 410 and control logic 420, which in the present embodiment includes a processor, for controlling the operation of the inverters 410, which is schematically represented in FIG. 4.

Although for the purposes of the present embodiment the in-wheel electric motor includes two control devices, where each control device includes control logic, in other words a controller, for controlling the operation of an inverter, any configuration of control logic and inverter combination may be used, including placing the control logic and/or inverters remote to the electric motor.

The annular capacitor is coupled across the inverters 410 and the electric motor's DC power source for reducing voltage ripple on the electric motor's power supply line, otherwise known as the DC busbar, and for reducing voltage overshoots during operation of the electric motor. For reduced inductance the capacitor is mounted adjacent to the control devices 400. Accordingly, current flow to the electric motor is via the DC busbar, where the electric motor acts as an electrical load to the DC power source with the DC power source's voltage being placed across the DC busbar. As described below, a current sensor is used to measure the DC busbar line current to the electric motor.

A rotor 240 comprises a front portion 220 and a cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coil windings on the stator 252 so that magnetic fields generated by the coils interact with the magnets 242 arranged around the inside of the cylindrical portion 221 of the rotor 240 to cause the rotor 240 to rotate. As the permanent magnets 242 are utilized to generate a drive torque for driving the electric motor, the permanent magnets are typically called drive magnets.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

FIG. 3 shows an exploded view of the same motor assembly illustrated in FIG. 2 from the opposite side. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

A V shaped seal is provided between the circumferential wall 221 of the rotor and the outer edge of the stator.

The rotor also includes a set of magnets 227 for position sensing, otherwise known as commutation magnets, which in conjunction with sensors mounted on the stator allows for a rotor flux angle to be estimated. The rotor flux angle defines the positional relationship of the drive magnets to the coil windings. Alternatively, in place of a set of separate magnets the rotor may include a ring of magnetic material that has multiple poles that act as a set of separate magnets.

To allow the commutation magnets to be used to calculate a rotor flux angle, preferably each drive magnet has an associated commutation magnet, where the rotor flux angle is derived from the flux angle associated with the set of commutation magnets by calibrating the measured commutation magnet flux angle. To simplify the correlation between the commutation magnet flux angle and the rotor flux angle, preferably the set of commutation magnets has the same number of magnets or magnet pole pairs as the set of drive magnet pairs, where the commutation magnets and associated drive magnets are approximately radially aligned with each other. Accordingly, for the purposes of the present embodiment the set of commutation magnets has 32 magnet pairs, where each magnet pair is approximately radially aligned with a respective drive magnet pair.

A sensor, which in this embodiment is a Hall sensor, is mounted on the stator. The sensor is positioned so that as the rotor rotates each of the commutation magnets that form the commutation magnet ring respectively rotates past the sensor.

As the rotor rotates relative to the stator the commutation magnets correspondingly rotate past the sensor with the Hall sensor outputting an AC voltage signal, where the sensor outputs a complete voltage cycle of 360 electrical degrees for each magnet pair that passes the sensor, where the AC voltage signal output by the Hall sensor can be used for both rotor position detection and for determining rotor velocity ($\omega$).

For improved position detection, preferably the sensor includes an associated second sensor placed 90 electrical degrees displaced from the first sensor.

In the present embodiment the electric motor includes four coil sets with each coil set having three coil sub-sets that are coupled in a wye configuration to form a three phase sub-motor, resulting in the motor having four three phase sub-motors. The operation of the respective sub-motors is controlled via one of the two control devices 400, as described below. However, although the present embodiment describes an electric motor having four coil sets (i.e. four sub motors) the motor may equally have one or more coil sets with associated control devices. In a preferred embodiment the motor includes eight coil sets 60 with each coil set having three coil sub-sets that are coupled in a wye configuration to form a three phase sub-motor, resulting in the motor having eight three phase sub-motors. Similarly, each coil set may have any number of coil sub-sets, thereby allowing each sub-motor to have two or more phases.

FIG. 4 illustrates the connections between the respective coil sets 60 and the control devices 400, where a respective coil set 60 is connected to a respective three phase inverter 410 included on a control device 400 for controlling current flow within the respective coil sets. As is well known to a person skilled in the art, a three phase inverter contains six switches, where a three phase alternating voltage may be generated by the controlled operation of the six switches. However, the number of switches will depend upon the number of voltage phases to be applied to the respective sub motors, where the sub motors can be constructed to have any number of phases.

Figure 5:
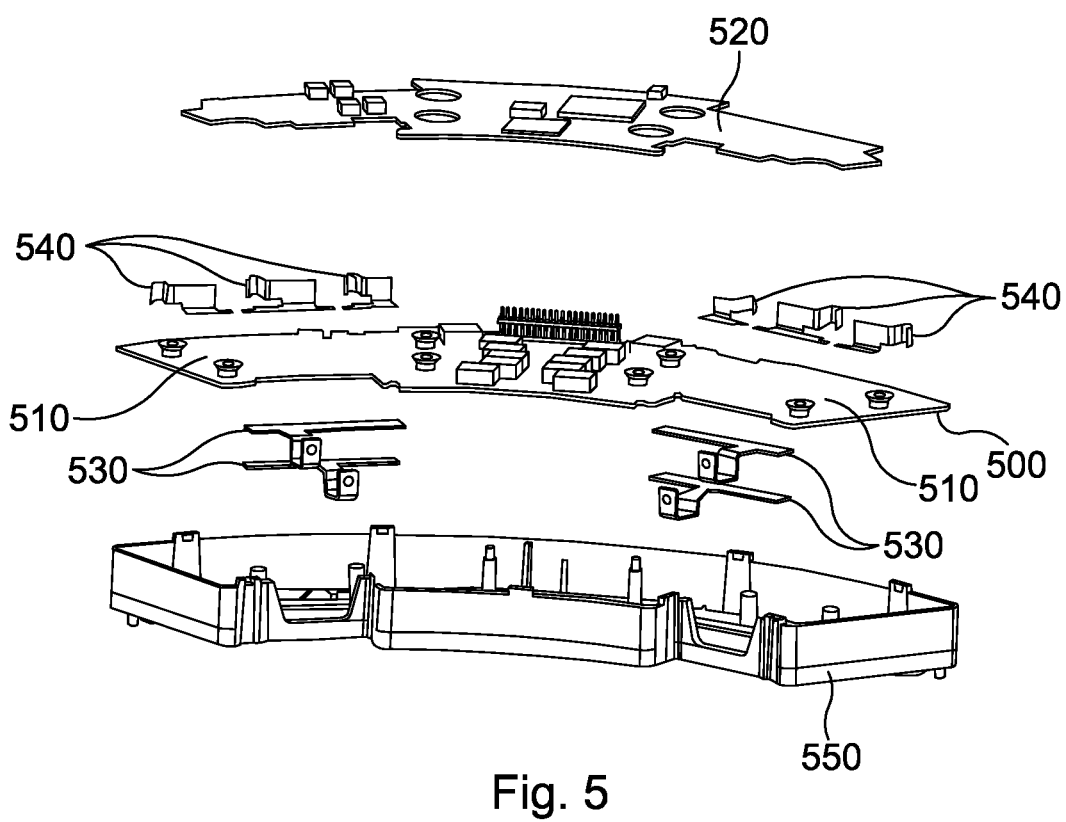
FIG. 5 illustrates an exploded view of a control device according to an embodiment of the present invention.

Preferably, the control devices 400 are of a modular construction. FIG. 5 illustrates an exploded view of a preferred embodiment, where each control device 400, otherwise known as a power module, includes a power printed circuit board 500 in which are mounted two power substrate assemblies 510, a control printed circuit board 520, four power source busbars 530 for connecting to a DC battery, and six phase winding busbars 540 for connecting to respective coil windings. Each of the control device components are mounted within a control device housing 550 with the four power source busbars 530 being mounted on an opposite side of the control device housing 550 to the phase winding busbars 540.

As stated above, current flow to the electric motor, in other words the line current, is via the respective power source busbars, where the electric motor acts as an electrical load to the DC power source with the DC power source's voltage being placed across the respective power source busbars.

Each power substrate 510 is arranged to be mounted in a respective aperture formed in the power printed circuit board 500.

The power printed circuit board 500 includes a variety of components that include drivers for the inverter switches formed on the power substrate assemblies 510, where the drivers are typically used to convert control signals into a suitable form to turn the inverter switches on and off.

The control printed circuit board 520 includes a processor for controlling the operation of the inverter switches. Additionally, each control printed circuit board 520 includes an interface arrangement to allow communication between the respective control devices 400 via a communication bus with one control device 400 being arranged to communicate with a vehicle controller mounted external to the electric motor. The processor 420 on each control device 400 is arranged to handle communication over the interface arrangement.

As stated above, the processors 420 on the respective control devices 400 are arranged to control the operation of the inverter switches mounted on the respective power substrates 520 within the control housing 550, thereby allowing each of the electric motor coil sets 60 to be supplied with a three phase voltage supply resulting in the respective coil sub-sets generating a rotating magnetic field. As stated above, although the present embodiment describes each coil set 60 as having three coil sub-sets the present invention is not limited by this and it would be appreciated that each coil set 60 may have one or more coil sub-sets.

Under the control of the respective processors 420, each three phase bridge inverter 410 is arranged to provide pulse width modulation PWM voltage control across the respective coil sub-sets, thereby generating a current flow in the respective coil sub-sets for providing a required torque by the respective sub-motors, where the current flow in the respective coil sub-sets is known as phase current.

PWM control works by using the motor inductance to average out an applied pulse voltage to drive the required current into the motor coils. Using PWM control an applied voltage is switched across the motor windings. During the period when voltage is switched across the motor coils, the current rises in the motor coils at a rate dictated by their inductance and the applied voltage. The PWM voltage control is switched off before the current has increased beyond a required value, thereby allowing precise control of the phase current within the coil sub-sets to be achieved.

For a given coil set 60 the three phase bridge inverter 410 switches are arranged to apply a single voltage phase across each of the coil sub-sets.

Using PWM switching, the plurality of switches are arranged to apply an alternating voltage across the respective coil sub-sets. The voltage envelope and phase angle of the electrical signals is determined by the modulating voltage pulses. FIG. 6 illustrates an example of phase currents in a coil set having three coil sub-sets, otherwise known as a three phase motor configuration, showing three phases.

The inverter switches can include semiconductor devices such as MOSFETs or IGBTs. In the present example, the switches comprise IGBTs. However, any suitable known switching circuit can be employed for controlling the current. For a three phase inverter having six switches configured to drive a three phase electric motor, the six switches are configured as three parallel sets of two switches, where each pair of switches is placed in series and form a leg of the three phase bridge circuit, with a fly-back diode, otherwise known as a reverse diode, coupled in anti-parallel across each switch. A single phase inverter will have two pairs of switches arranged in series to form two legs 600 of an inverter.

As stated above, each of the inverter legs 600 are electrically coupled between a pair of power source busbars.

As stated above, PWM switching is used to apply an alternating voltage to the electric motors coil windings, where the rotor speed is dependent upon the amplitude of the voltage applied across the coil windings. The torque applied to the rotor results from phase current within the coil windings, where motor torque is proportional to the amplitude of the phase current. In other words:

$T \propto I_2$, where $I_2$=rotor phase current amplitude,

The control system for preventing a hazard induced yaw condition will now be described, where the power differential between the power being applied to the first wheel by a first in-wheel electric motor and the power being applied to the second wheel by a second in-wheel electric motor is monitored. Upon a determination that the power differential between the power being applied to the first wheel and the second wheel is greater than a predetermined value, the controller is arranged to reduce the power differential. Empirical driver response studies indicate that power asymmetry values greater than 30 kW/tonne typically result in a hazardous induced yaw condition occurring that a driver of a vehicle may find difficult to control. Accordingly, in a preferred embodiment if the power differential between the power being applied to the first wheel and the second wheel is greater than 30 kW/tonne of vehicle weight, the controller is arranged to reduce the power differential. However, other power asymmetry threshold values may be used to indicate a hazard induced yaw condition.

As the derivation of power includes a speed term the power differential threshold value used for identifying a hazard induced yaw condition, for example 30 kW/tonne, is applicable across the vehicle's speed range and is not speed dependent. Accordingly, unlike torque asymmetry limits the same power differential threshold value can be used for identifying a hazard induced yaw condition irrespective of vehicle speed.

In a first embodiment, mechanical power generated by the respective in-wheel electric motors is estimated, where power monitoring is implemented within the motors themselves. Mechanical power is estimated using phase current measurements to estimate the torque generated by the respective in-wheel electric motors. The value of torque (T) is then combined with rotational velocity ($\omega$) of the respective rotors to provide an estimate of motor mechanical power, namely a product of torque and rotational velocity (T $\omega$).

As the hazard induced yaw is dependent upon torque asymmetry between at least two wheels transversely located relative to each other on a vehicle, as illustrated in FIG. 1, factors external to the respective motors that influence the amount of power being applied at the interface between the vehicle and a road (i.e. tyre contact patch) may be cancelled out, for example frictional losses. Accordingly the estimated mechanical power based on power monitoring implemented within the respective electric motors may be used to implement a safety mechanism that monitors the power discrepancy between two motors, where appropriate action can be taken to avoid a hazardous induced yaw condition should the power asymmetry exceed a threshold value, for example 30 kW/tonne.

In a second embodiment, electrical motor power is estimated, where electrical motor power is estimated by measuring the DC traction voltage across the DC busbars that are coupled to the respective in-wheel electric motors together with the line current provided to the motors. Accordingly, the estimated electrical motor power is determined using a product of voltage and current (VI) provided to the respective electric motors.

Although, the power asymmetry can be calculated by determining the electrical power for each in-wheel electric motor and then determining the difference in electrical power between the two in-wheel electric motors, in a preferred embodiment, as both electric motors are coupled to the same battery, and consequently the voltage applied across both electric motors will be the same, the difference in line currents provided to the respective electric motor can be used to provide an asymmetric power determination.

Preferably, the difference between the motor currents is determined by passing the current supplied to both electric motors through the same current measuring device in opposite directions. This enables the difference in line current provided to both electric motors to be determined in a single step, while also reducing the number of components required to measure current, thereby allowing a purely hardware power monitoring solution to be implemented.

As with the mechanical power estimation, the electrical power estimation is not required to accurately reflect the actual power being applied to the tyre contact patch. Continuous monitoring of asymmetry in estimated electrical power estimation is sufficient to detect a hazardous induced yaw condition.

Preferably, to account for advanced stability control features (e.g. torque vectoring), the stability control system described above for identifying a hazardous induced yaw condition uses stability control data to determine when power asymmetries of greater than the designated threshold value, for example 30 kW/tonne, can legitimately be ignored, for example when the stability control system is modifying the torque to individual wheels in order to modify the handling characteristics of the vehicle. Such examples include traction control and/or vehicle dynamic control that require a power asymmetry of greater than 30 kW/tonne power. As such, if the stability control system identifies that the vehicle's stability control requires power asymmetries of greater than the designated threshold value to achieve required handling characteristics, the power monitoring system is arranged not to reduce the identified power asymmetry. Alternatively, the stability control system may be pre-programmed with a variety of different power asymmetry values, where the different power asymmetry values apply to different handling characteristics associated with the vehicle, which might be driver selectable.

Risks associated with the hazard induced yaw form part of the safety requirements associated with an automotive design, where normally the risk associated with the hazard induced yaw will be determined using the ISO 26262 risk model.

The hazard induced yaw risk classification is typically vehicle dependent, and will ultimately depend on the characteristics of the given vehicle, but for induced yaw it could be as high as ASIL D. Therefore, the electrical power estimation or the mechanical power estimation safety mechanism, described above, for identifying an induced yaw condition may inherit an ASIL D integrity level.

However, an ASIL D development process is very resource intensive.

However, as the electrical power estimation and mechanical power estimation safety mechanisms described above provide independent mechanisms for identifying a hazard induced yaw condition, the combination of both mechanisms within a vehicle allows the ISO 26262 technique of requirements decomposition to be used to reduce the ASIL integrity level requirements. This has the advantage of allowing development costs to be reduced, while also making it possible for customers to utilise existing electronic control modules (e.g. an existing in-board motor control module).

FIG. 7 illustrates a preferred embodiment of a power monitoring architecture for use in the vehicle illustrated in FIG. 1, where the power monitoring architecture includes both electrical power estimation and mechanical power estimation safety mechanisms for identifying and correcting a hazard induced yaw condition, thereby allowing the ASIL rating associated with the stability control system to be reduced.

The vehicle includes two in-wheel electric motors 710 that are arranged to drive the first wheel (i.e. the front near side wheel) and the second wheel (i.e. the front offside wheel) respectively.

To support the mechanical power estimation functionality, the control devices associated with both in-wheel electric motors include first sensing means 720, first power monitoring means 730 and a software drive disable function 740.

The first sensing means 720 is arranged to determine the mechanical power being developed by the respective in-wheel motor ($P_A$) from motor phase current and speed, as described above.

The first power monitoring means 730 associated with each in-wheel electric motor is arranged to compare the mechanical power being developed by its own motor (e.g. $P_{A1}$) with that of the other motor (e.g. $P_{A2}$), and sends a software disable request to the software drive disable function 740 should the asymmetric power exceed the predetermined threshold value $P_{ASY}$ (for example, greater than 30 kW/tonne) unless a dynamic control function within the main controller 102 indicates that an advanced stability control features (e.g. torque vectoring) has been selected that requires power asymmetries of greater than the designated threshold value.

As such, if the dynamic control function identifies that the vehicle's stability control requires power asymmetries of greater than the designated threshold value to achieve required handling characteristics, the stability control system is arranged not to reduce the identified power asymmetry, for example the dynamic control function may over ride the software disable request or set a different power asymmetry threshold value.

The software drive disable function 740 within the motor is arranged to disable the motor drive PWM waveforms in response to receipt of a software disable request received from the first power monitoring means 730.

To support the electrical power estimation functionality, the main controller 102 includes a second power monitoring means 750 with second sensing means 760 being incorporated within the vehicle 100 external to the in-wheel electric motors 710 and a hardware drive disable function 770 incorporated within both in-wheel electric motors 710.

The hardware drive disable function 770 is independent of the software disable function 740, where the motor will be disabled if either the hardware drive disable function 770 or the software disable function 740 is active The second sensing means 760, mounted external to the respective in-wheel electric motors 710, independently determines the asymmetric electrical power being developed by both in-wheel electric motors by determining the traction voltage provided to both in-wheel electric motors and the difference between motor currents (delta I) being provided to the in-wheel electric motors, as described above.

FIG. 8 illustrates a preferred embodiment of the second sensing means 760, where the second sensing means 760 incorporates a resistive potential divider circuit 810 for sensing the voltage of the power source coupled to the respective in-wheel electric motors 710 and a current sensor 820 (for example a Hall Effect/ferrite core sensor) where the current carrying cables supplying current to the respective in-wheel electric motors are routing through the current sensor in opposite directions to allow a current difference to be determined, thereby avoiding the need to have two separate current sensors and circuitry for determining a difference in current measured by both current sensors.

Upon the second sensing means 760 determining that a difference between motor currents (delta I) being provided to the respective in-wheel electric motors 710 exceeds a threshold value, the second power monitoring means 750, incorporated within the main controller 102, is arranged to send a hardware disable request to the respective hardware drive disable functions 770 incorporated within the respective in-wheel electric motors 710 unless a dynamic control function 780 indicates that an advanced stability control features (e.g. torque vectoring) has been selected that requires power asymmetries of greater than the designated threshold value.

As stated above, if the dynamic control function identifies that the vehicle's stability control requires power asymmetries of greater than the designated threshold value to achieve required handling characteristics, the power monitor system is arranged not to reduce the identified power asymmetry, for example the dynamic control function may set a different power asymmetry threshold value.

Although the stability control system described in the above embodiment issues a motor disable request if a hazard induced yaw condition is identified, alternatively, a torque reduction request may be issued to reduce the power differential between the two in-wheel electric motors.

The above described embodiment is capable of identifying and addressing power asymmetries greater than a designated threshold value in the scenarios where:

1. The motor incorrectly delivers a demanded torque (for example, due to an internal failure);
2. A vehicle control unit external to the motor demands an incorrect torque, however in this scenario the torque asymmetry will only be detected once the torque delivered by the motors achieves the demanded torque;
3. One or more motors incorrectly reads a torque demand value, again this will be detected when the torque delivered by the motors achieves the incorrectly read torque demand value.

In an alternative embodiment, the electric motors can be configured to check that a torque demand would not exceed the maximum permitted power delta across the axle before trying to achieve the required torque demand. For example, the power is checked at the demand stage by calculating the demanded power. Power is torque multiplied by speed so at the motor, a calculation is done by multiplying the speeds of the motors by the demanded torque. An external control unit, for example a vehicle control unit, responsible for issuing a torque demand can perform a similar calculation, where in this case the external control unit may use the speed signal from the ABS sensors.

This embodiment allows power asymmetries to be identified at an earlier stage. In other words, if it is known that a torque demand will cause a power asymmetry to exceed a threshold value this can be address before the torque is generated.

It will be apparent to those skilled in the art that the disclosed subject matter may be modified in numerous way and may assume embodiments other than the preferred forms specifically set out as described above, for example, upon the control system identifying that the power asymmetry between the two electric motors exceeds the predetermined threshold value, rather than disable both in-wheel electric motor, if the power asymmetry is a result of a fault with one of the sub motors in one of the in-wheel electric motors, the torque generated by that in-wheel electric motor may be increased by increasing the torque of the other sub motors, thereby reducing the power asymmetry. Additionally, a hazardous induced yaw condition may be identified by monitoring power asymmetry between different axles of a vehicle.

The invention claimed is:

1. A control system for a vehicle having a first wheel arranged to be driven by a first drive source and a second wheel arranged to be driven by a second drive source, wherein the first wheel and the second wheel are transversely located on the vehicle relative to each other, the control system comprising:
a controller; and
a monitoring device,
wherein:
the monitoring device is arranged to monitor the power differential between the power being applied to the first wheel by the first drive source and the power being applied to the second wheel by the second drive source, and
upon a determination that the power differential between the power being applied to the first wheel and the second wheel is greater than a predetermined value, the controller is arranged to reduce the power differential.

2. The control system according to claim 1, wherein the first drive source and the second drive source is an electric motor.

3. The control system according to claim 1, wherein the first drive source is a first in-wheel electric motor and the second drive source is a second in-wheel electric motor.

4. The control system according to claim 1, wherein the monitoring device is arranged to monitor mechanical power generated by the first drive source and the second drive source.

5. The control system according to claim 1, wherein the monitoring device is arranged to monitor electrical power generated or consumed by the first drive source and the second drive source.

6. The control system according to any one of claims 1 to 3, wherein the monitoring device is arranged to monitor mechanical power generated by the first drive source and the second drive source and electrical power generated by the first drive source and the second drive source to allow the control system to identify a hazard-induced yaw condition based upon both a mechanical power differential and an electrical power differential.

7. The control system according to claim 6, wherein the monitoring device includes a first arrangement for monitoring the mechanical power generated by the first drive source and the second drive source and a second arrangement for monitoring the electrical power generated by the first drive source and the second drive source.

8. The control system according to claim 7, wherein the first arrangement is incorporated within the first drive source and the second drive source.

9. The control system according to claim 7, wherein the second arrangement includes a current sensor mounted external to the first drive source and the second drive source.

10. The control system according to claim 1, wherein the controller is arranged to reduce the power differential by turning off both the first drive source and the second drive source.

11. The control system according to claim 1, wherein the controller is arranged to reduce the power differential by turning off both the first drive source and the second drive source using a software drive disable and/or a hardware drive disable.

12. The control system according to claim 1, wherein the controller is arranged to not reduce the power differential if it is determined that a predetermined handling characteristic requires a power asymmetry greater than the threshold value.

13. The control system according to claim 1, wherein the monitoring device includes a current sensing device that determines the power differential between the first drive source and the second drive source based on a difference in current provided to the first drive source and the second drive source.

14. The control system according to claim 13, wherein the difference in current is determined by arranging the current flow to the first drive source and the second drive source to pass through the current sensing device in opposite directions.

15. A method for a vehicle having a first wheel arranged to be driven by a first drive source and a second wheel arranged to be driven by a second drive source, wherein the first wheel and the second wheel are transversely located on the vehicle relative to each other, the method comprising:
monitoring the power differential between the power being applied to the first wheel by the first drive source and the power being applied to the second wheel by the second drive source,
wherein upon a determination that the power differential between the power being applied to the first wheel and the second wheel is greater than a predetermined value, reducing the power differential.

16. The method of claim 15, wherein each of the first drive source and the second drive source is an electric motor.

17. The method of claim 15, wherein both of the first drive source and the second drive source are a single electric motor.

18. The method of claim 15, wherein monitoring the power differential includes monitoring the mechanical power generated by the first drive source and the second drive source and electrical power generated by the first drive source and the second drive source to allow the control system to identify a hazard-induced yaw condition based upon both a mechanical power differential and an electrical power differential.

* * * * *